(12) United States Patent
Wickliffe

(10) Patent No.: US 6,454,671 B1
(45) Date of Patent: Sep. 24, 2002

(54) FRONT BICYCLE DERAILLEUR WITH ANNULAR CHAIN GUIDE

(76) Inventor: Christopher Alan Wickliffe, 1320 16th St., Ogden, UT (US) 84404

( * ) Notice: Subject to any disclaimer, the term of this patent is extended or adjusted under 35 U.S.C. 154(b) by 0 days.

(21) Appl. No.: 09/488,657

(22) Filed: Jan. 20, 2000

(51) Int. Cl.$^7$ .............................. F16H 9/00; F16H 63/00
(52) U.S. Cl. ........................................... 474/80; 474/82
(58) Field of Search .............................. 474/80, 82, 119, 474/140, 144, 101, 78, 79, 69, 117

(56) References Cited

U.S. PATENT DOCUMENTS

| | | | | |
|---|---|---|---|---|
| 3,813,955 A | * | 6/1974 | Huret et al. | 474/82 |
| 3,890,847 A | * | 6/1975 | Dian | 474/82 |
| 4,078,444 A | | 3/1978 | Huret | |
| 4,194,409 A | | 3/1980 | Nagano | |
| 4,433,963 A | | 2/1984 | Shimano | |
| 4,437,848 A | | 3/1984 | Shimano | |
| 4,573,950 A | | 3/1986 | Nagano | |
| 4,599,079 A | * | 7/1986 | Chappell | 474/80 |
| 4,618,332 A | | 10/1986 | Nagano | 474/80 |
| 4,734,083 A | | 3/1988 | Nagano | |
| 4,832,667 A | * | 5/1989 | Wren | 474/140 |
| 5,688,200 A | * | 11/1997 | White | 474/80 |
| 5,728,018 A | | 3/1998 | Terada et al. | |
| 5,779,581 A | | 7/1998 | Fujii | |
| 5,782,714 A | | 7/1998 | Osgood | |
| 5,846,148 A | | 12/1998 | Fujii | |

FOREIGN PATENT DOCUMENTS

| | | | | |
|---|---|---|---|---|
| FR | 2605969 | * | 5/1988 | |
| FR | 2621968 | * | 4/1989 | |
| IT | 452463 | * | 10/1949 | 474/80 |

* cited by examiner

Primary Examiner—David A. Bucci
Assistant Examiner—Marcus Charles
(74) Attorney, Agent, or Firm—TraskBritt

(57) ABSTRACT

A front bicycle derailleur which utilizes a substantially annular chain guide for engagement and disengagement of the bicycle chain with multiple chain rings of a crankset. The annular chain guide provides an opening for the bicycle chain to pass through. The opening is sized only slightly larger than the cross section of the bicycle chain and is smooth and rounded along the inner surfaces that come in contact with the bicycle chain. The relatively small opening allows for precise and efficient positioning of the bicycle chain. The annular chain guide also serves to maintain the position of the bicycle chain to prevent derailment or unwanted shifting of the bicycle chain during pedaling.

5 Claims, 12 Drawing Sheets

FRONT BICYCLE DERAILLEUR WITH ANNULAR CHAIN GUIDE

BACKGROUND OF THE INVENTION

1. Field of the Invention

This invention relates generally to bicycle derailleurs. More specifically, this invention relates to a front bicycle derailleur which incorporates a chain guide which maintains the lateral position of the bicycle chain, reduces chain wear and drag, and keeps the bicycle chain from derailing off of a plurality of chain rings on a crankset.

2. Background of Related Art

Most bicycles have multiple gears with front and rear derailleurs to change gears. A front derailleur is used to shift a bicycle chain between two or more chain rings of a crankset. Chain rings vary in diameter, each having a different number of teeth for engagement with the bicycle chain. The force required to turn the crank is determined, in part, by the particular chain ring the bicycle chain is engaged with. The size of the chain ring can also determine the number of revolutions that will be required of the crank in order to travel a certain distance. By changing the chain engagement from a chain ring of one size to another, the bicyclist can strategically choose how much force will be required to be applied to the cranks, as well has how many revolutions the cranks will make in order to travel a relative distance.

A front derailleur is typically mounted on the seat tube of a bicycle frame and near the chain rings. The front chain rings are typically arranged so as to be concentric with, and parallel to each other. The smallest chain ring is typically closest to the bicycle frame with the chain rings progressively growing in diameter as they get further from the bike frame. The purpose of a front derailleur is to urge the bicycle chain laterally away from the currently engaged chain ring and towards a chain ring selected by the rider through means of a properly connected shifting device. Front derailleurs of various designs have been utilized to perform this function and most have similar features.

Construction and operation of a basic front derailleur is described in U.S. Pat. No. 4,734,083 to Nagano. The Nagano front derailleur includes a member for fixing the front derailleur to the bicycle, a four pin linkage mechanism to effect a pantographic type movement of two guide members, the guide members typically being designated as the inner guide member and the outer guide member. When the assembly is activated to move away from the bicycle frame and toward a larger chain ring, the inner guide pushes the bicycle chain laterally away from the bike frame until the bicycle chain leaves the currently engaged chain ring and engages the next chain ring. The action of urging the bicycle chain onto a larger chain ring often involves the step of pressing the bicycle chain against the side of the larger chain ring. By pressing the bicycle chain against the chain ring, friction combines with the circular motion of the chain ring to "pull" the bicycle chain up and on to the chain ring. When the assembly is activated to move toward the bicycle frame and toward a smaller chain ring, the outer guide urges the bicycle chain in a similar manner, with the outer guide pressing the bicycle chain off of the larger chain ring, and then allowing the bicycle chain to fall onto the smaller chain ring.

The inner and outer guides are spaced at a width which is wider than that of the bicycle chain, often one and a half to two times as wide as the bicycle chain. This allows the bicycle chain to run between the guides without contacting the guides while also allowing for some lateral movement of the bicycle chain which occurs when the bicycle chain is changed from one gear to another by a rear derailleur on a rear sprocket set. The inner and outer guides each typically comprise a substantially flat elongated surface. The guides are placed substantially parallel to one another and are connected together with a front and rear link. An elongated spatial channel, often referred to as a cage, is thus defined by the inner and outer guides and the front and rear links. The bicycle chain then passes through the cage without touching the inner and outer guides or the front and rear links during normal operation. There are typically multiple links of chain within the spatial area defined by the cage at any given time.

A typical front derailleur requires periodic adjustment to prevent the bicycle chain from engaging an undesired sprocket, or disengaging all sprockets (also known as derailing). A derailed bicycle chain causes complete loss of power transmission to the driving wheel. Bicycle chain engagement with an undesired chain ring causes the bicyclist to either apply more or less force to the cranks, or perform fewer or greater crank revolutions than would be desired. Such problems are particularly annoying to the bicyclist when ascending a slope. Because the cage of a derailleur is significantly wider than the width of the bicycle chain, a slight misadjustment of the front derailleur can allow for either of the above situations to arise during normal bicycling activities.

One solution for bicycle chain derailment is found in a mechanism referred to as a chain guide. The general design and function of a chain guide can be seen in U.S. Pat. No. 5,782,714 to Osgood. The Osgood device is a stationary member affixed to the bicycle seat tube to prevent the bicycle chain from disengaging laterally toward the bicycle frame from the chain ring closest to the bicycle frame. The Osgood device thus places a limit on the inward movement of the bicycle chain but does not prevent a derailment of the outermost large chain ring. Another approach to bicycle chain derailment is a second outer chain guide placed on the outside of the largest chain ring. This outer chain guide is circular, typically a slightly larger diameter than that of the largest chain ring, and is placed concentric with, and adjacent to, the largest chain ring. This outer chain guide places a limit on the outward movement of the bicycle chain. However, an outer chain guide such as this is often cumbersome and unsightly. Neither of these chain guides prevent the bicycle chain from disengaging the selected chain ring to engage with a non-selected chain ring. Thus there is a need in the art for a front derailleur with a chain guide that prevents derailments, both inward and outward, and also prevents the bicycle chain from disengaging a selected chain ring and engaging a non-selected chain ring.

SUMMARY OF THE INVENTION

The present invention provides a front derailleur for engaging and disengaging the bicycle chain among various sized chain rings on a bicycle crankset. The present invention further provides a chain guide integrated with the front derailleur to maintain proper alignment of the bicycle chain with a preselected chain ring.

The present invention comprises an annular chain guide attached to a positioning mechanism mounted on a bicycle frame and adjacent to the chain rings. The annular chain guide serves as both a derailleur for disengaging the bicycle chain off of one chain ring for subsequent engagement with a different chain ring and also as a chain guide to prevent inadvertent shifting of the bicycle chain from one chain ring to another, thus preventing derailment of the bicycle chain.

The annular chain guide greatly reduces surface to surface contact between the chain and guide, thus reducing wear on the chain and the derailleur. The novel chain guide does not press the chain against the chainring during upshifting, but rather guides the chain up and onto the chainring with an annular chain guide positioned behind the chainrings. This is in contrast to a standard front derailleur in which, during upshifting, the inner chain guide presses against the chain which then presses against the chainring onto which it is being shifted, creating drag and making it difficult to shift smoothly, especially when the bicycle is moving uphill.

BRIEF DESCRIPTION OF THE DRAWINGS

In the drawings, which depict presently preferred embodiments of the invention and in which like reference numerals refer to like parts in different views.

DETAILED DESCRIPTION OF THE INVENTION

Figure 1:
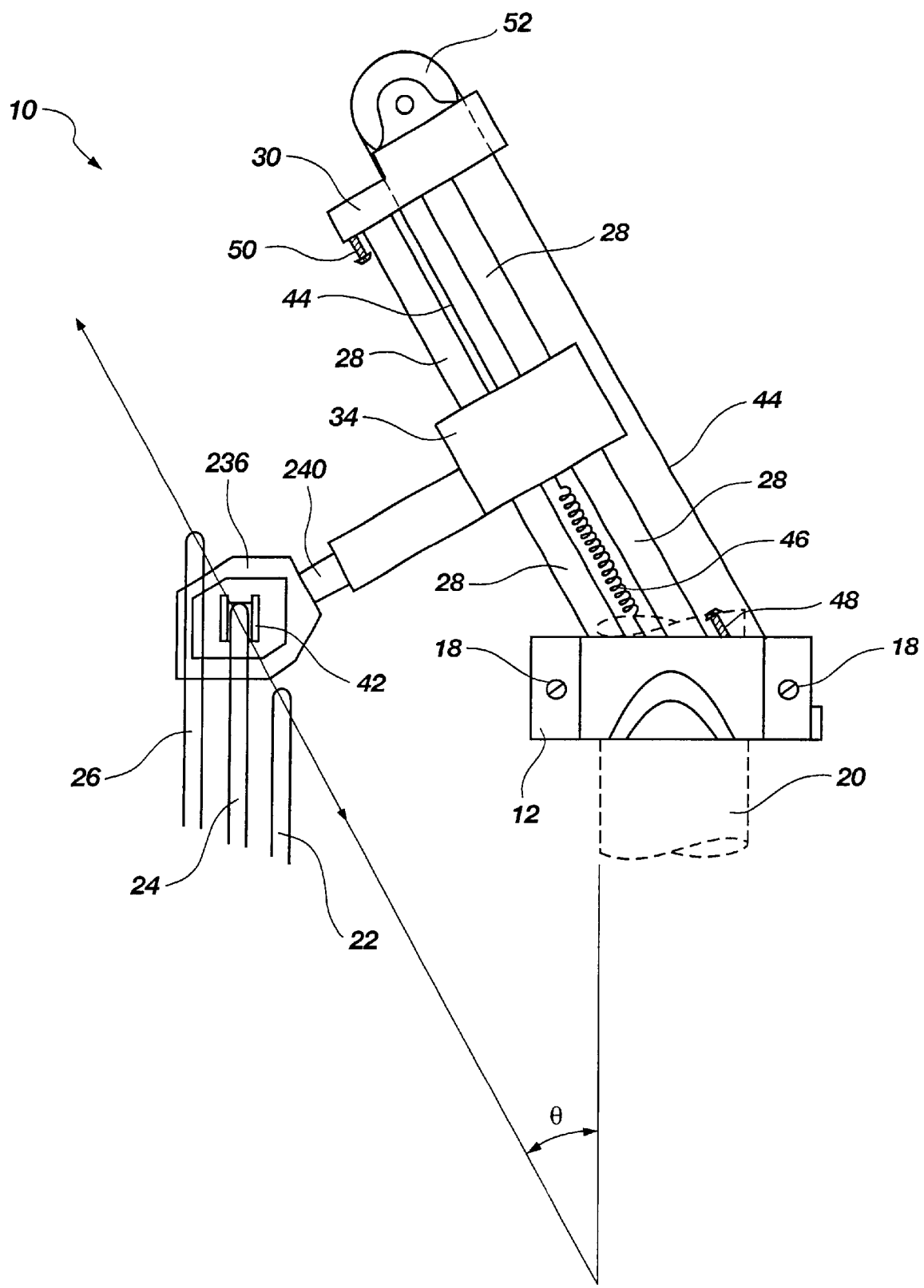
FIG. 1 is a view of a preferred embodiment of the present invention, as viewed from the front of a bicycle.
Figure 2:
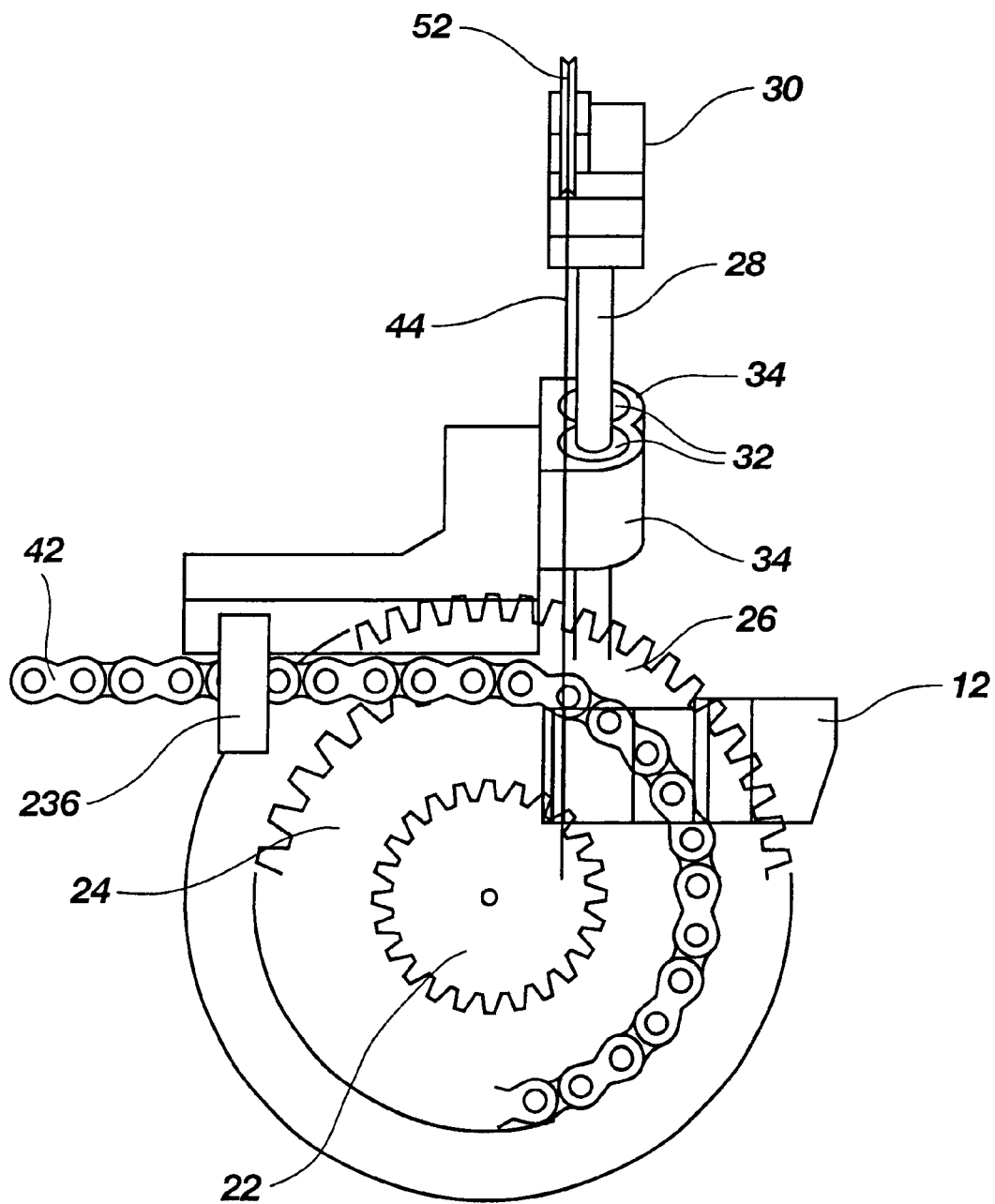
FIG. 2 is a view of the embodiment of the invention of FIG. 1, viewed from the side of the bicycle.
Figure 3:
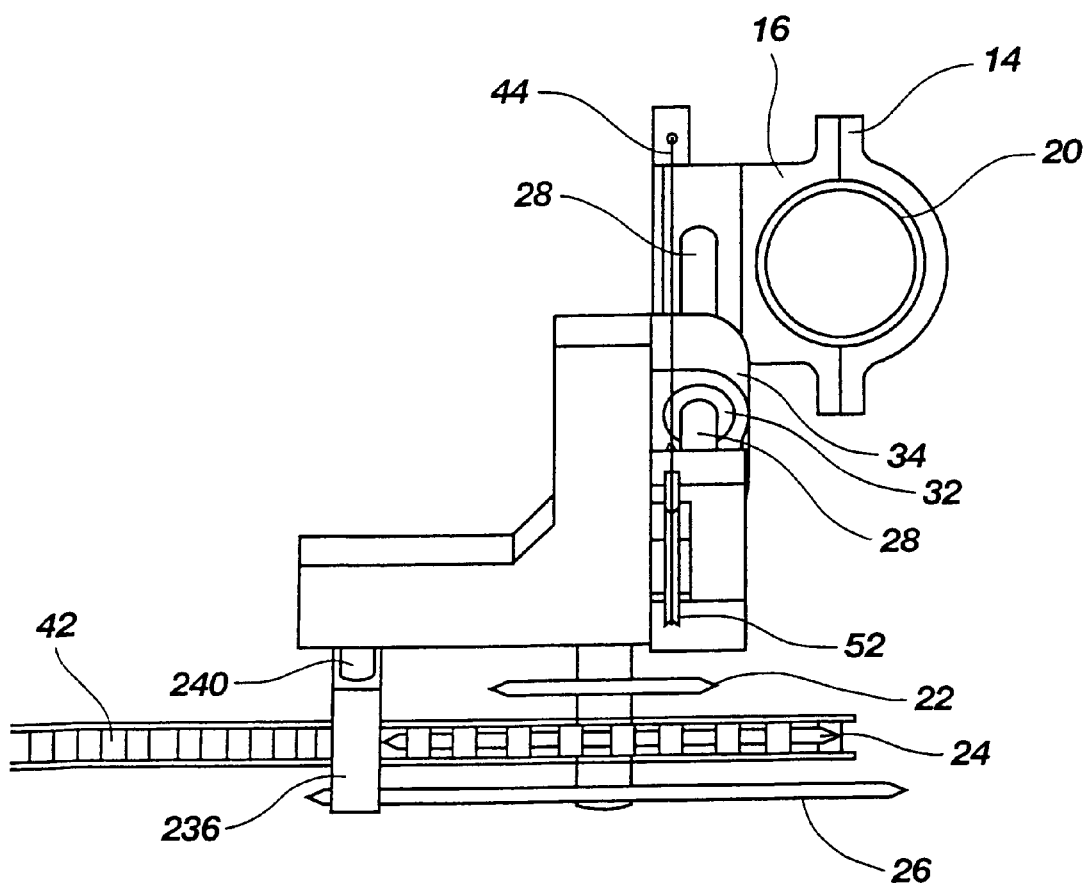
FIG. 3 is a view of the embodiment of invention of FIGS. 1 and 2, viewed from above.

Referring to FIGS. 1 through 3, a front derailleur 10 is shown comprising a mounting member 12 fastened to a bicycle frame member, such as the seat tube 20, and disposed adjacent to the chain rings 22, 24, and 26 of a bicycle crankset. While three chain rings are shown in FIGS. 1 through 3, it would be obvious to apply the instant invention to a bicycle configured with any number of chain rings, e.g., a crankset with only two chain rings.

The mounting member 12 is a split clamp which allows for installation on numerous bicycle frames. The mounting member 12 is shown as being a two piece clamping mechanism wherein fasteners 18 provide the clamping action between a front mounting member 14 and a rear mounting member 16. Fasteners 18 may be screws, cam locks, rivets, hinge members or other means for securing members 14 and 16. It is contemplated that mounting member 12 could alternatively be a bracket for fastening to a braze-on mount on the seat tube of the bicycle frame, or a bracket for fastening to another structural member of the bicycle frame. All of the above mounting methods are known to one of skill in the art and thus, are not further described herein.

Attached to the mounting member 12, are two linear guide rods 28. The linear guide rods 28 are cylindrical in shape and are typically formed of a metal such as stainless steel with a polished finish. The linear guide rods 28 are placed next to each other in a parallel orientation. Attached at the top end of the linear guide rods 28 is a structural member 30 for maintaining the parallel relationship of the two linear guide rods 28. A sliding arm 34 houses two linear bearings 32 which are slidably disposed on and around the linear guide rods 28. The linear guide rods 28 constrain movement of the sliding arm 34 along the length of the linear guide rods 28. An angle $\theta$ is defined using the seat tube 20 as a reference line and by drawing a line from the vertical tip of the largest chain ring 26 through the vertical tip of the smallest chain ring 22. The linear guide rods 28 are preferably oriented at the angle $\theta$ placing the top of the linear guide bearings 32 laterally away from the bicycle frame towards, and adjacent to, the chain rings 22, 24 and 26. It will be appreciated that the specific value of the angle $\theta$ depends on the sizes and spacing of the chain rings used, and the invention is not limited to a particular value for $\theta$.

Alternative shapes and designs could be utilized for the linear guide rods 28. For example, the linear guide rods 28 need not be cylindrical. However, whatever shape the linear guide rods 28 are chosen to be, the linear bearings 32 must be compatible with, and be slidably disposed on, the linear guide rods 28. Likewise, a different number of linear guide rods 28 may be employed, including the use of only one linear guide rod 28. However, if only one linear guide rod 28 is utilized, other means (such as keying the guide rod 28, with a slot for example, and then matching linear bearing 32 to the guide rod) must be employed to constrain rotational movement of the sliding arm 34.

A substantially annular chain guide 236 is attached to the sliding arm 34, and positioned so as to receive a bicycle chain 42 therethrough. The annular chain guide 236 is preferably formed of stainless steel for strength, durability and corrosion resistance. The opening in the annular chain guide 236 may be sized only slightly larger that the cross-section of the bicycle chain 42. The annular chain guide 236 is coupled to the sliding arm 34 by means of a stem 240. The stem 240 is fixedly attached to the annular chain guide 236, which may be accomplished by welding, by other bonding methods, by mating threads, or by fasteners. The stem 240 may be coupled to the sliding arm 34 by insertion into a bore (not shown) in the sliding arm 34. The stem 240 is a pre-selected length allowing for adjustment of the stem 240 axially within the bore. The stem 240 is keyed, preferably cylindrical with a flat section cut lengthwise on one side of the cylinder. A set screw (not shown) is located in the sliding arm 34 and presses against the flat section of the stem 240 to fix the position of the stem 240, both axially and radially, within the bore.

Other means may be employed for coupling the annular chain guide 236 to the sliding arm 34. For example, the annular chain guide 236 and stem may be formed as one element either by machining or casting. Alternatively, an integrated one piece unit may be employed, wherein the stem 240 is eliminated and the annular chain guide 236 is formed as an integral component of the sliding arm 34. Again, this may be accomplished through either machining or casting of the integrated unit. Arrangements such as these have the benefit of fewer required parts for the assembly of the derailleur 10.

Figure 6A:
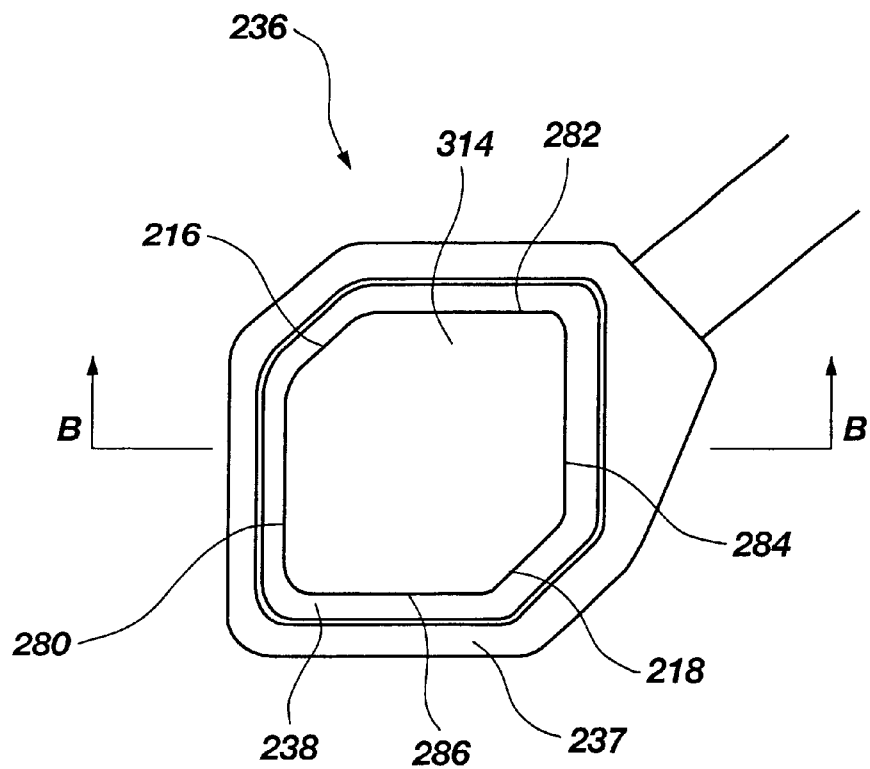
FIGS. 6A and 6B are views of a chain guide for use in the embodiment of the invention shown in FIGS. 1 through 3.
Figure 6B:
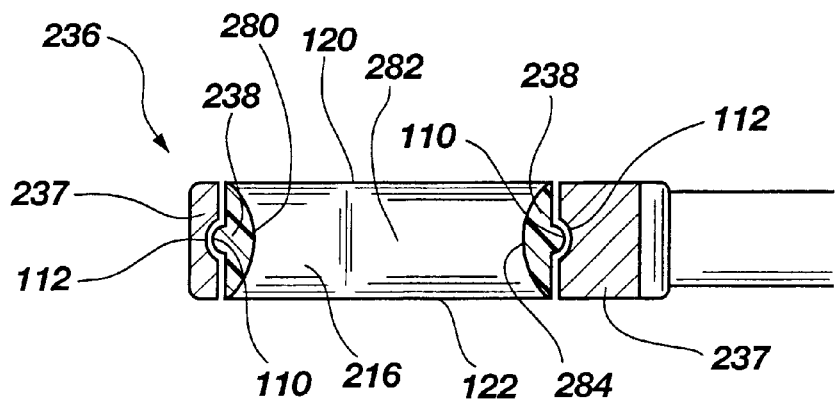

One embodiment of annular chain guide 236 for use with the embodiment of the invention shown in FIGS. 1–3 is depicted in FIGS. 6A and 6B. An annular insert 238 is housed within the an outer rim 237. The annular insert 238 may be formed of a relatively hard non-metallic material such as nylon, polytetrafluoroethylene, or other teflon-type materials which have desirable wear and low friction properties. By placing an annular insert 238 in this location, the bicycle chain 42 will be in contact with a wear surface which is made of a material softer than that of the bicycle chain 42. This will prevent undue wear on the bicycle chain, which wear occurs when any derailleur repeatedly engages a bicycle chain to urge the bicycle chain from one chain ring to another. The opening in the annular insert 238 may be sized only slightly larger than the cross-section of the bicycle chain 42.

Referring to FIG. 6A, the annular chain guide 236 of the presently preferred embodiment is shown as being annular, in the sense that it is a continuous band or ring-like element, but which is substantially rectangular rather than circular. The corners, both inside and outside, are preferably rounded. The annular insert 238 is shown as having a substantially rectangular outer perimeter sized and shaped to match the inside surface of the outer rim 237. As seen in FIG. 6B, the inside surface of the outer rim 237 and the outer perimeter of the annular insert 238 are substantially mating parts. A lip 110 is formed on the outer perimeter of the annular insert 238, and a matching groove 112 is formed along the inside surface of outer rim 237. The annular insert 238 is coupled to the outer rim 237 by positioning the lip 110 of the annular insert 238 into the groove 112 of the outer rim 237. The annular insert 238 may be installed by pressing it into the opening of the outer rim 237 until the lip 110 is securely resting in the groove 112. Alternatively, adhesive may also be used to secure the annular insert 238 within the annular chain guide 236. A small amount of elastic deformation of the annular insert 238 is allowed to accomplish installation of the annular insert 238. Removal of the annular insert 238 is accomplished in a similar manner by pressing the annular insert 238 out of the outer rim 237 with an appropriate amount of force. Thus, the annular insert 238 is secured to the outer rim 237 during operation of the bicycle, but may be removed for replacement or for other maintenance requirements.

Referring again to FIG. 6A, the annular insert 238 defines a substantially parallelogrammatic aperture 314 through which the bicycle chain 42 passes. The aperture 314 is defined by an outer wall 280, an inner wall 284, a top wall 282 and a bottom wall 286. Two obtuse corner walls 216 and 218 are formed in the aperture 314. The corner upper-outer corner wall 216 and lower-inner corner wall 218 are oriented at an angle substantially transverse or perpendicular to the line of movement of the annular chain guide 236. The corners of the aperture 314 are radiused. By orienting the aperture 314 as described above, the upper-outer corner wall 216 acts to pull the bicycle chain 42 both inward and downward during the operation of the derailleur 10 in urging the bicycle chain 42 toward a smaller chain ring. Likewise, the lower-inner corner wall 218 acts to push the bicycle chain 42 both upward and outward when urging the bicycle chain 42 toward a larger chain ring. Top and bottom walls 282 and 286 and inner and outer walls 284 and 280 are preferably spaced far enough apart to accomodate changes in vertical and lateral position of the chain associated with different rear sprocket positions. Alternatively, aperture 314 may be circular, oval, or any other shape which is effective for urging the bicycle chain from one chain ring to another, and which does not catch or bind the chain.

Referring to FIG. 6B, the walls 280, 282, 284, and 286 of the aperture 314 are smooth and rounded as they are traversed from the front side 120 to the back side 122. The rounded and smooth configuration of the aperture 314 allows the annular insert 238 to interact with the bicycle chain 42 while having a minimum amount of surface contact between the two elements. This configuration prevents the bicycle chain 42 from catching or binding, and reduces wear on the interacting surfaces.

Referring back to FIG. 1, a control wire 44, also know as a "shifter cable", is attached to the sliding arm 34. The control wire 44 is also attached to a shifting device (not shown) which allows the bicyclist to control the movement of the sliding arm 34. A biasing member, shown as a spring 46, has one end attached to the sliding arm 34 and the other end attached to either the mounting member 12. Thus the spring 46 acts to bias the sliding arm 34 in downward manner.

Still referring to FIG. 1, operation of the front derailleur 10 will now be explained. A bicyclist, desiring to engage the bicycle chain 42 with a particular chain ring 26, will activate the shifting device (not shown) accordingly. In activating the shifting device, the control wire 44 is either pulled upwards, or relaxed and allowed to move downwards, relative to the mounting member 12. If the control wire 44 is pulled upwards, the sliding arm 34 is motivated upward, and outward, along the axis of the linear guide rods 28 as defined by angle θ. The aperture of the annular insert 238 engages the bicycle chain 42 and urges the bicycle chain 42 upward and outward from one chain ring 24 for engagement with the next larger chain ring 26. The chain is urged to a position slightly above the chain ring and then allowed to lower slightly so that it engages with the chain ring. If the control wire 44 is relaxed, the spring 46 pulls the sliding arm 34 downward, and inward, along the axis of the linear guide rods 28. Again, the aperture of the annular chain guide 236 engages the bicycle chain 42, this time motivating the bicycle chain 42 downward and inward from one chain ring 24 to the next smaller chain ring 22. Adjustable stops 48 and 50 are attached to the rear mounting member 16 and the structural member 30 respectively. The adjustable stops 48 and 50 serve to limit the downward and upward travel of the sliding arm 34. By properly limiting the motion of the sliding arm 34, the bicycle chain 42 will also be limited in its range of movement as defined by the distance between largest and the smallest chain rings 26 and 22 respectively. The small aperture in the annular chain guide 236, in combination with the properly defined limits of movement of the sliding arm 34, work to prevent improper disengagement or derailment of the bicycle chain 42. Once the shift has been completed (the chain has been shifted from one chain ring to another), annular chain guide 236 is positioned so that bicycle chain 42 is centered within and does not rub against annular chain guide 236.

A pulley 52 is attached to the structural member 30. The pulley allows for use of a control wire 44 that pulls downward instead of upward. The control wire 44 in a bottom pull design would run through the pulley 52 and then connect to the sliding arm 34. Thus the preferred embodiment is easily adapted to bicycles having either top pull or bottom pull designs.

While various elements of the disclosed derailleur 10 have been discussed as being formed from stainless steel, other materials may be utilized in the construction of the derailleur 10 depending on the overall intended use of the bicycle to which the derailleur 10 will be mounted. Some of the contemplated materials would include carbon steel, aluminum, titanium, or a composite material such as resin-impregnated carbon fiber. Each of these materials has various desirable qualities and selection of material may depend on numerous factors such as corrosion protection, wear characteristics, strength to weight ratio, and cost to manufacture and assemble. The selection of appropriate materials is within the knowledge of one skilled in the art.

Figure 7A:
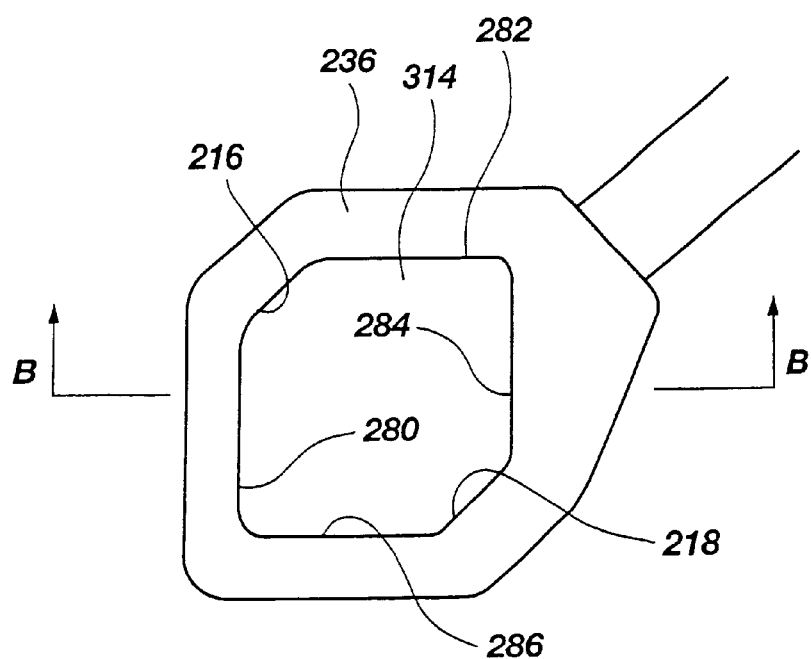
FIGS. 7A and 7B are views of an alternative embodiment of the chain guide for use in the embodiment of the invention shown in FIGS. 1 through 3.
Figure 7B:
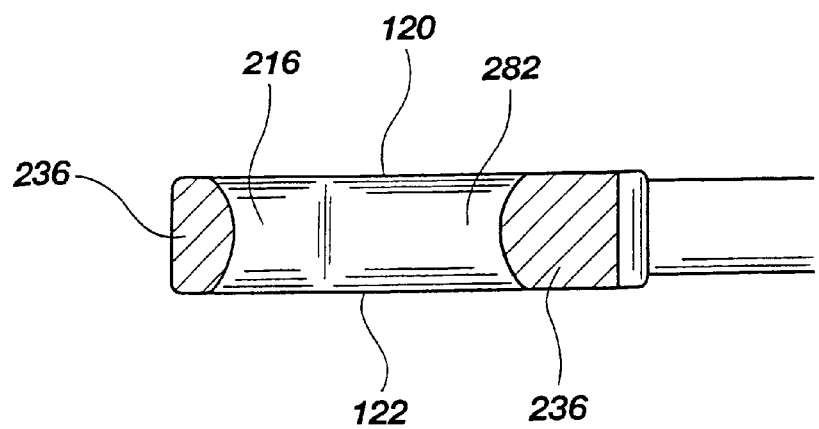

It is noted that various modifications could be made to the present invention without departing to from the spirit or scope of the invention. For example, the control wire 44 could be arranged so that it pulled in the downward direction, with the spring 38 biasing the sliding arm 34 in the upward direction and the pulley 52 being relocated accordingly. Also, alternative mechanisms could be utilized to induce the motion of the sliding arm 34. In another embodiment, hydraulics may be employed to control the motion of the sliding arm 34 in place of the control wire 44. Yet another embodiment includes an annular chain guide 236 constructed of a single material, without an annular insert 238, as shown in FIGS. 7A and 7B. The shape and functioning of the chain guide 236 is the same as the chain guide depicted in FIGS. 6A and 6B; however, because the surface of the guide contacting the chain is a harder material (e.g., metal) the wear to the chain will be increased, while the wear to the chain guide will be reduced. Yet another embodiment may include a second mounting member coupled between structural member 30 and the seat tube or other bicycle frame member to stabilize the one or more linear guide rods 28 when the bicycle chain 42 is being shifted. Furthermore, various combinations of alternative elements as discussed are within the scope and spirit of the present invention.

Figure 4:
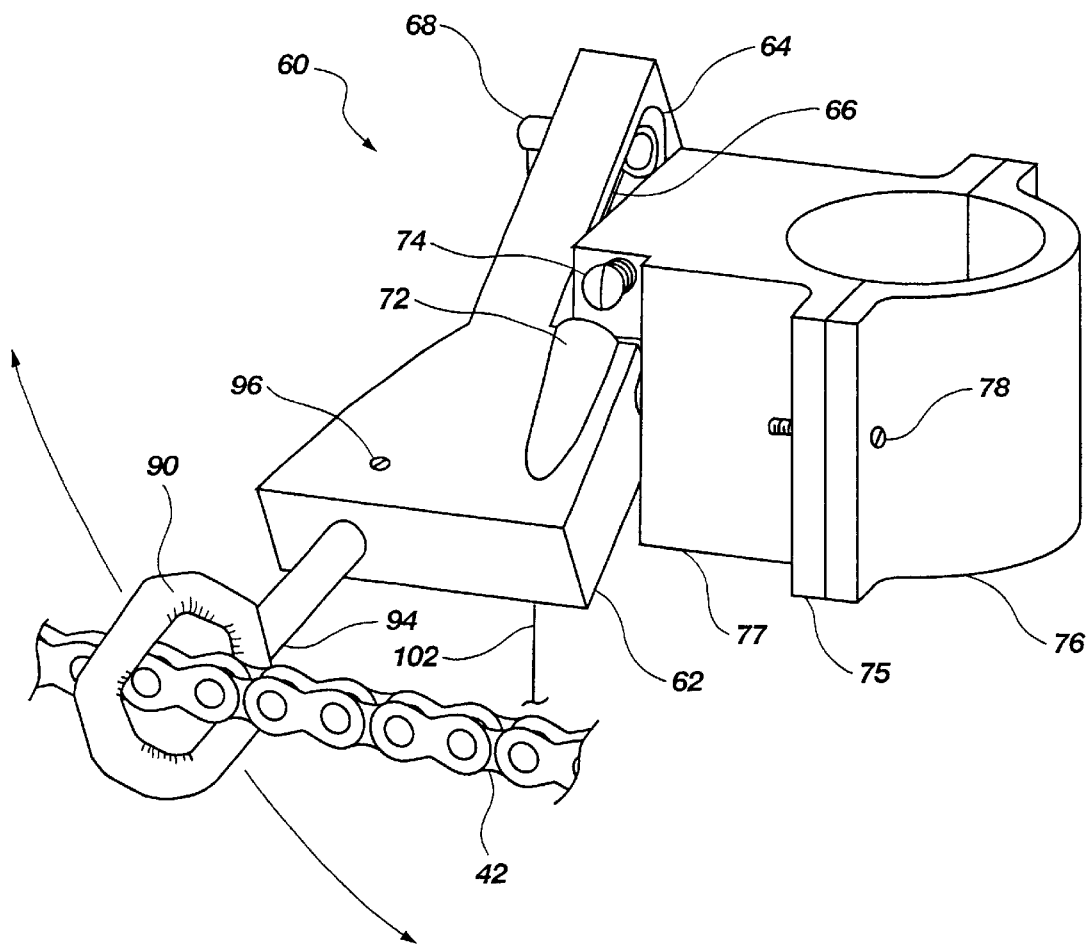
FIG. 4 is a perspective view of an alternative embodiment of the present invention.
Figure 5:
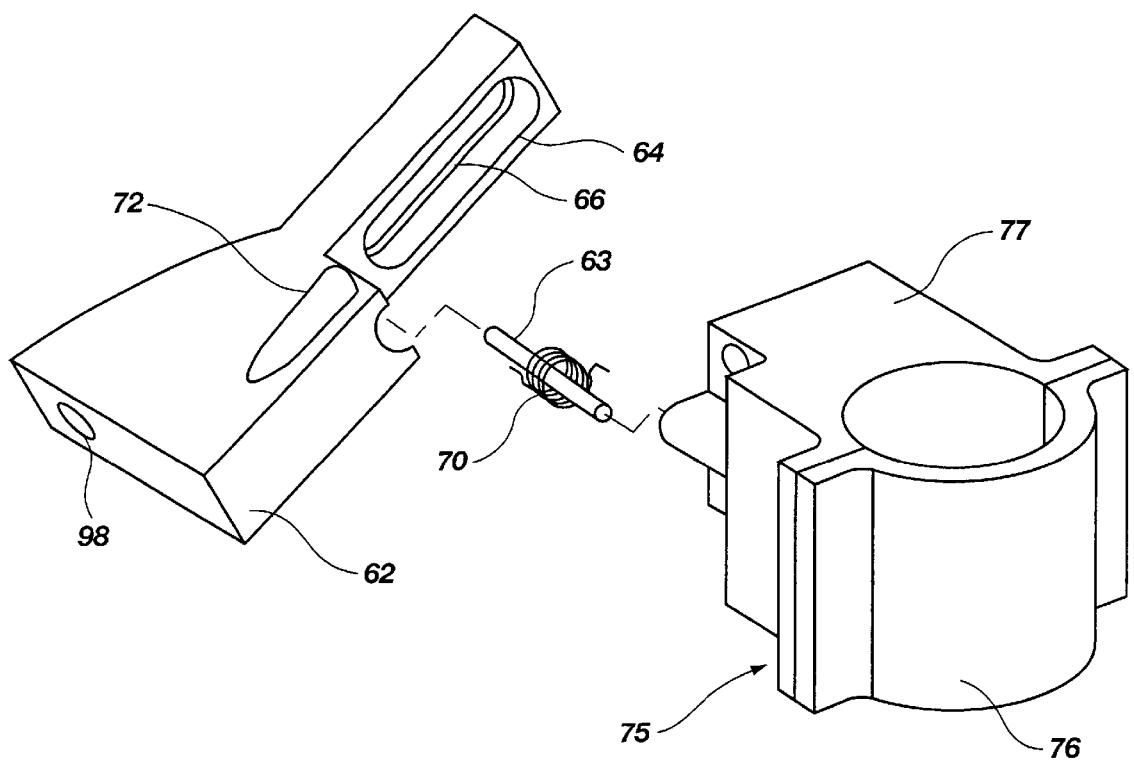
FIG. 5 is an exploded view of elements of the embodiment of FIG. 4.

Referring now to FIG. 4 and FIG. 5, another embodiment of a front derailleur 60 according to this invention is disclosed. A mounting member 75, is fastened to a bicycle frame member such as a seat tube (not shown). The mounting member 75 is a split clamp which allows for installation on numerous bicycle frames. The mounting member 75 is shown as being a two piece clamping mechanism wherein fasteners 78 provide the clamping action between a front mounting member 76 and a rear mounting member 77. Front and rear mounting members 76 and 77 may also be hinged together at one end to form a mounting member 75 with a hinged clamping mechanism. Fasteners 78 may be screws, cam locks, rivets or other means for securing members 76 and 77. It is contemplated that mounting member 75 could alternatively be a bracket for fastening to a braze-on mount on a seat tube of the bicycle frame, or a bracket for fastening to another member of the bicycle frame. All of the above mounting methods are within the knowledge of one skilled in the art and thus, are not further described herein.

A pivot arm 62 may be pivotally connected to the rear bracket member 77 by means of a bearing pin 63 or other suitable means. A coil spring 70 is housed between the rear mounting member 77 and the pivot arm 62 concentric with the bearing pin 63 to provide a torsional bias to pivot arm 62.

An annular chain guide 90 is connected to a stem 94 which is inserted into a bore 98 in the pivot arm 62. The stem 94 is keyed to the bore and is axially adjustable within the bore, A set screw 96 secures the position of the stem 94. Two embodiments of the chain guide 90 are shown in detail in FIGS. 8A, 8B, 9A and 9B. A bicycle chain 42 is received through the aperture of the annular insert 92, or alternatively through the aperture of the annular chain guide 90 if an annular insert 92 is not being utilized.

A slot 64 is provided in the back side of the pivot arm 62. The slot 64 has a shouldered surface 66 allowing the head of a fastener 68 to be seated thereon. The fastener 68 allows for attachment of a control wire 102. A stop 72 is shown on the top side of the pivot arm. The stop 72 interacts with an adjustment screw 74, which is threaded in the rear mounting member 77. The stop 72 and the adjustment screw 74 work together to define a rotational limit of the pivot arm 62. A similar stop and adjustment screw (not shown) are found on the bottom side of the derailleur 60 to limit rotational movement of the pivot arm 62 in the opposite direction.

The front derailleur 60 is operated by a bicyclist activating a shifting mechanism, or shifters, (not shown) which in turn causes the control wire 102 to either pull down on the back portion of the pivot arm 62, or to relax the tension on the control wire 102. When the control wire 102 is relaxed, the coil spring 70 acts torsionally to rotate the front portion of the pivot arm downward until the pivot arm 62 has reached its limit of rotation. Thus, the movement of the pivot arm 62 controls the position of the annular chain guide 90. The annular chain guide 90 travels in an arcuate path urging the bicycle chain 42 upward and outward, to the next largest chain ring (not shown in FIG. 4 or FIG. 5), or downward and inward to the next smallest chain ring.

Figure 8A:
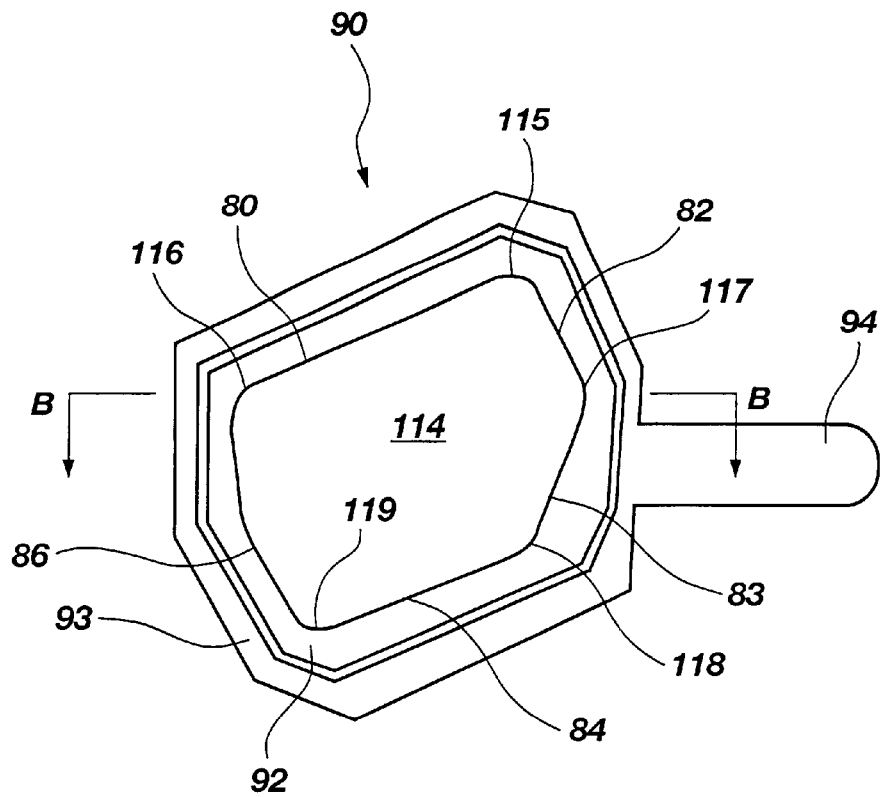
FIGS. 8A and 8B are views of a chain guide for use in the embodiment of the invention shown in FIGS. 4 and 5.
Figure 8B:
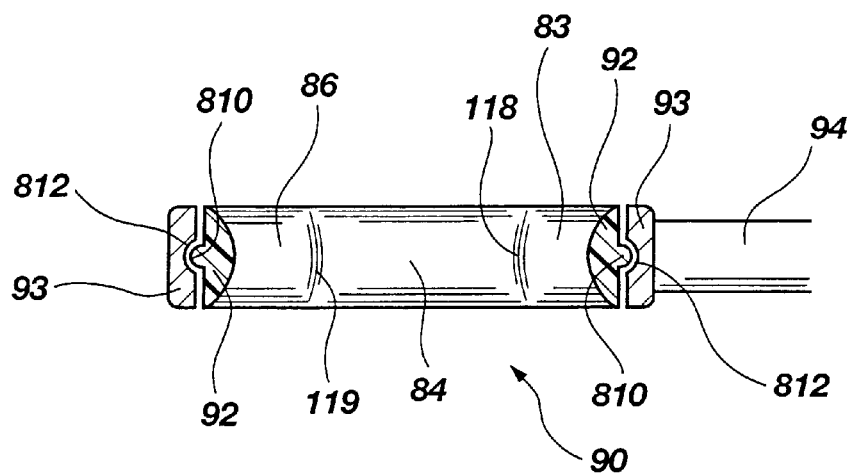
Figure 9A:
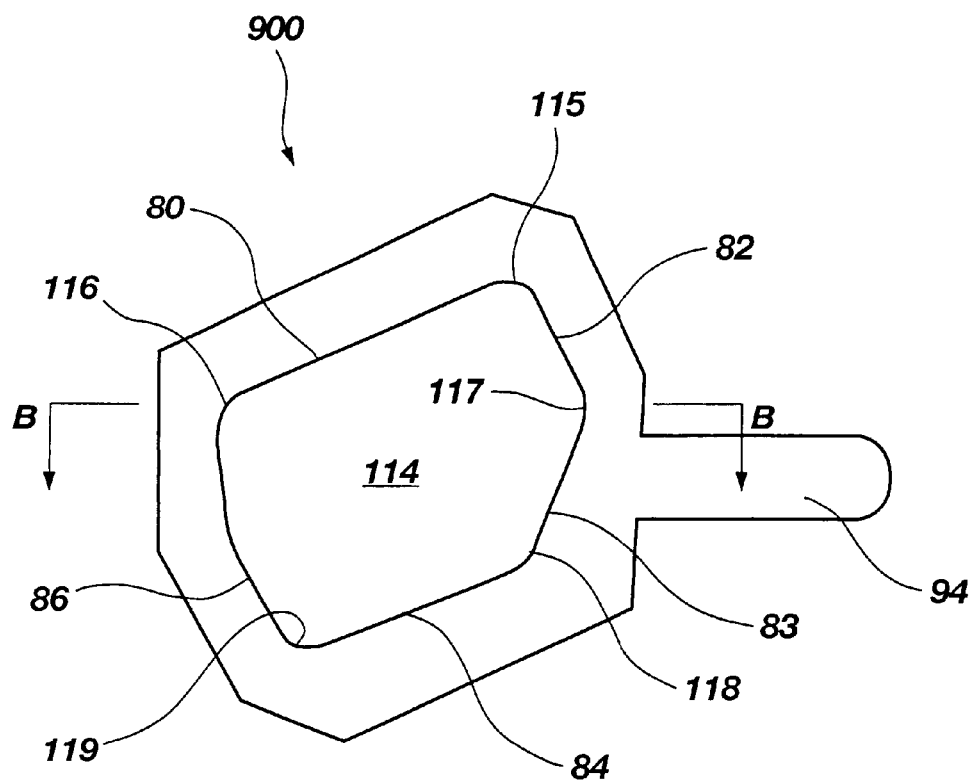
FIGS. 9A and 9B are views of an alternative embodiment of the chain guide for use in the embodiment of the invention shown in FIGS. 4 and 5.
Figure 9B:
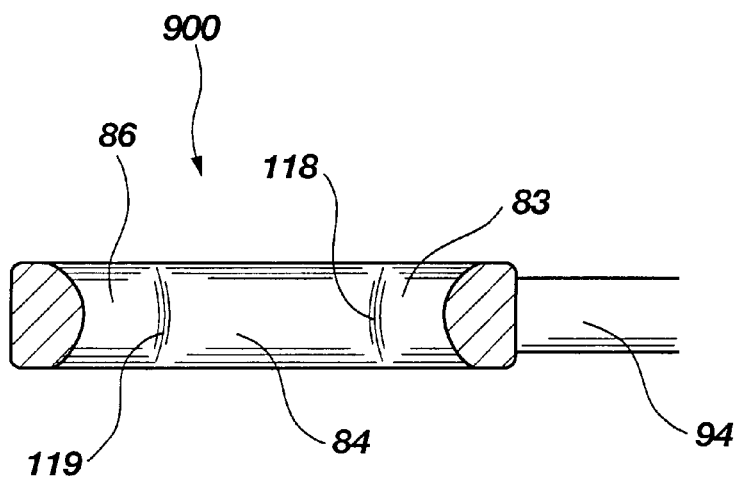

FIGS. 8A and 8B depict a preferred embodiment of the chain guide used in the embodiment of the invention shown in FIGS. 4 and 5. The chain guide differs from the chain guide used with the embodiment of the invention in FIGS. 1 through 3 in that the shape of aperture 114 has been modified so that the side of the aperture contacting the chain is oriented appropriately throughout the movement of the chain guide. In general, the chain is urged downward and inward by upper wall 80 of aperture 114 and upward and outward by lower wall 84 and lower-inner wall 83 of aperture 114. It will be appreciated that, because the chain guide moves in an arc rather than in a linear pattern, the side of the aperture contacting the chain varies as the chain guide is moved. Thus, when the chain guide is near the bottom of its arc (near the smallest chain ring) the chain will be urged upward by lower wall 84, and will contact lower wall 84 in the region. closer to corner 119. As the chain guide is moved upward and outward, in the arcuate path indicated in FIG. 4, the chain will move along lower wall 84 until it reaches corner 118, and then move onto lower-inner wall 83, until at the top of its arc, it will contact lower-inner wall 83 closer to corner 117. When the chain is to moved downward, at the highest part of the arc chain 42 will contact upper wall 80 closer to corner 116. As the chain guide is moved downward and inward, the chain will move toward corner 115 along upper wall 80. The embodiment of the chain guide 90 shown in FIGS. 8A and 8B includes an annular insert 92 which is secured to outer rim 93 by means of a lip 810 on insert 92 which fits into groove 812 formed in outer rim 93. The chain guide shown in FIGS. 9A and 9B is identical in shape to the chain guide of FIGS. 8A and 8B, but is constructed of a single material and does not include an annular insert 92.

Again, modifications to the disclosed embodiment are contemplated as being within the scope and spirit of the invention. For example, various shapes and configurations of the annular chain guide 90 and annular insert 92 may be employed in the instant embodiment. Likewise, alternative embodiments are contemplated wherein the stem 94 is coupled to the swing arm 62 in a different manner, such as by welding or another type of bonding. The stem 94 could also be eliminated altogether to create an integral unit of the annular chain guide 90 and the swing arm 62. Furthermore, the components of the derailleur 60 as just described may be made from various materials such as stainless steel, aluminum, titanium, or composite materials depending on the desired corrosion and wear resistance, as well as the desired strength to weight ratio.

In yet another embodiment, a positioning member may comprise a four pin linkage mechanism as described in U.S. Pat. No. 4,743,083 to Nagano, the disclosure of which is herein incorporated by reference. In this embodiment the annular chain guide 236 (or 90) is coupled to, and positioned by, a four pin linkage mechanism.

Figure 10:
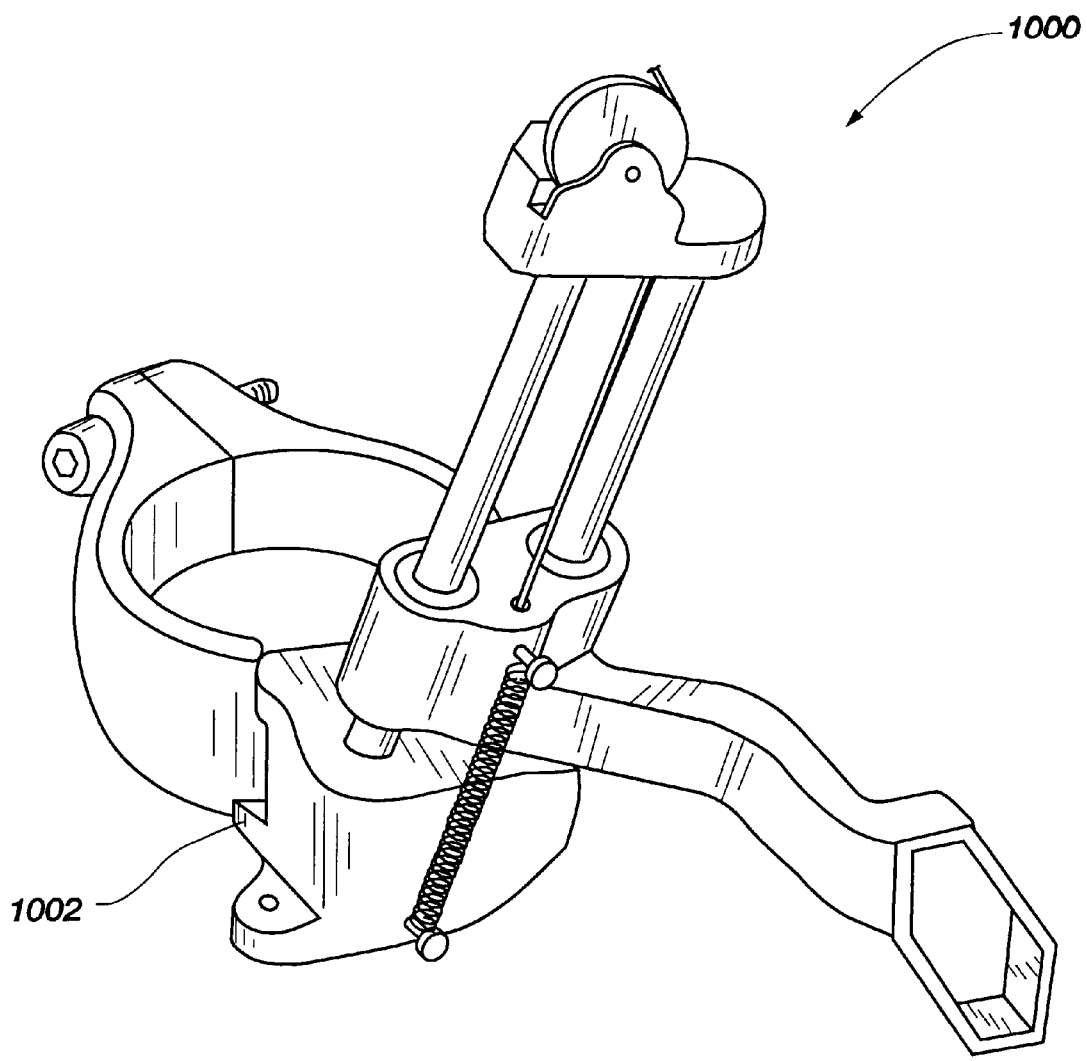
FIG. 10 is a perspective view of a front derailleur including a hinged mounting mechanism in accordance with the present invention.
Figure 11:
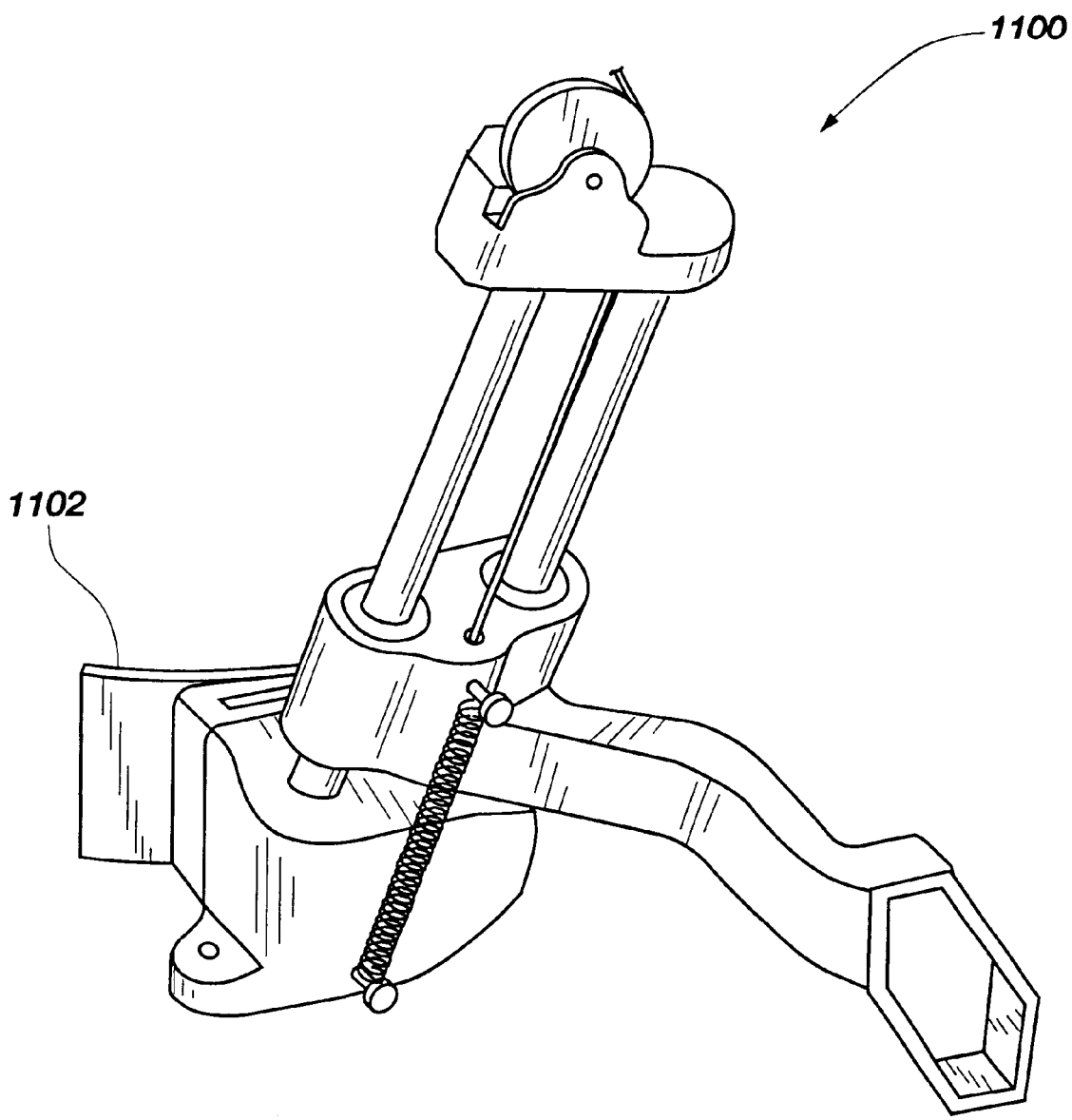
FIG. 11 is a perspective view of a front derailleur including a braze-on mounting mechanism in accordance with the present invention.
Figure 12:
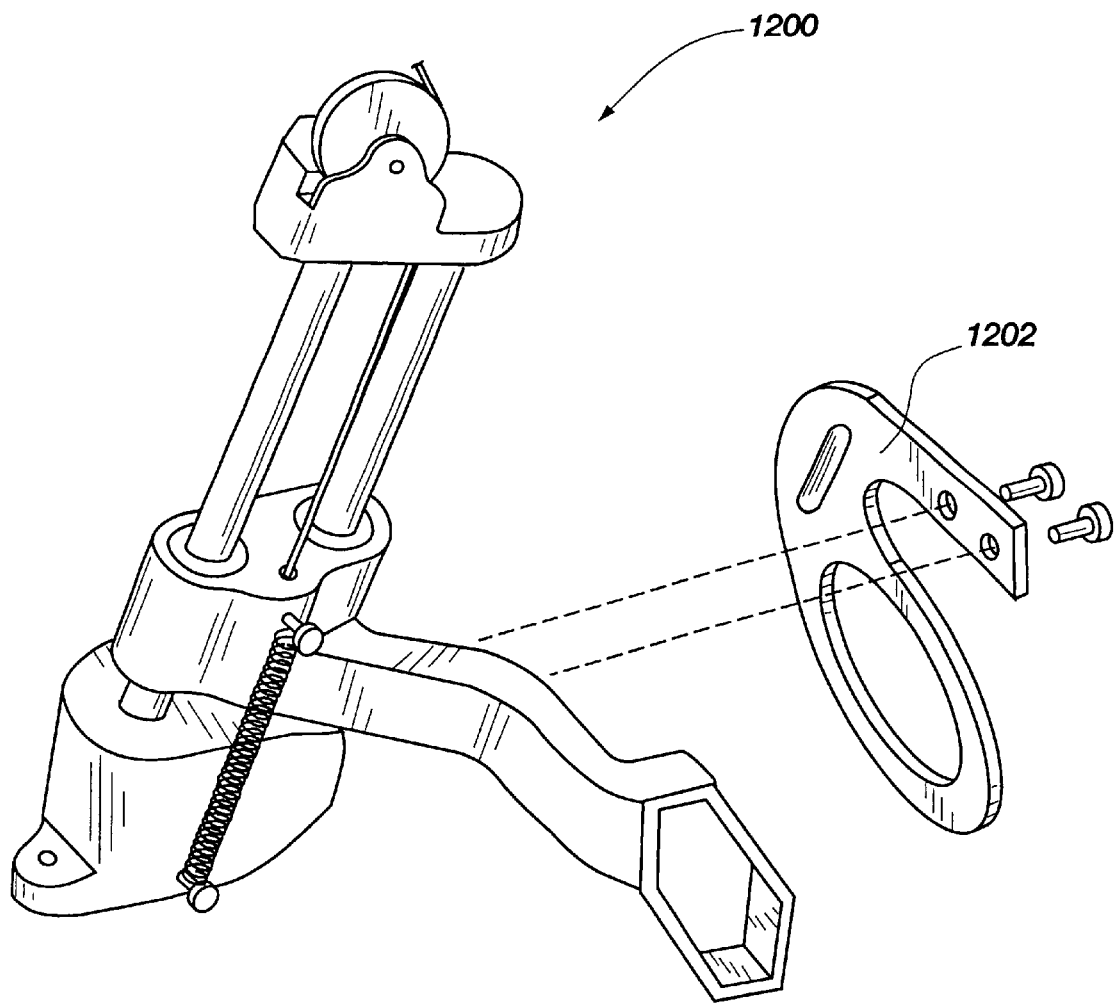
FIG. 12 is a perspective view of a front derailleur including a bottom bracket mounting mechanism in accordance with the present invention.

FIG. 10 is a perspective view of a front derailleur 1000 in accordance with the present invention including a hinged mounting mechanism 1002. FIG. 11 is a perspective view of a front derailleur 1100 in accordance with the present invention including a braze-on mounting mechanism 1102. FIG. 12 is a perspective view of a front derailleur 1200 in accordance with the present invention including a bottom bracket mounting mechanism 1202 configured for attaching front derailleur 1200 to a bottom bracket (not shown).

Although this invention has been described with reference to particular illustrated embodiments, the invention is not limited to the embodiments described. Rather, it should be understood that the embodiments described herein are merely exemplary and that a person skilled in the art may make many variations and modifications without departing from the spirit and scope of the invention as defined by the following claims.

What is claimed is:

1. A bicycle front derailleur comprising:
   a mounting member configured for attachment to a bicycle frame member;
   a movable positioning member connected to said mounting member;
   an annular chain guide attached to, and positionable by, said positioning member, wherein said annular chain guide is sized and configured to receive a bicycle chain therethrough; and
   an annular insert removably coupled to an inner surface of said annular chain guide and including an opening configured to allow a bicycle chain to pass through.

2. The bicycle front derailleur of claim 1, wherein said opening in said annular insert is substantially parallelogrammatic.

3. The bicycle front derailleur of claim 1, wherein said opening in said annular insert is substantially circular.

4. The bicycle front derailleur of claim 1, wherein said annular insert is made from a non-metallic material.

5. A bicycle front derailleur comprising:
   a mounting member for attachment to a bicycle frame member, said mounting member comprising at least one clamp configured for substantially encircling said bicycle frame member;
   at least one linear guide rod structurally connected to said mounting member, said at least one linear guide member being positioned at a pre-selected angle to said bicycle frame member;
   an arm slidably coupled to said at least one linear guide rod;
   an annular chain guide oriented for receiving a bicycle chain therethrough and attached to and positionable by said arm; and
   an annular insert removably attached to an inner surface of said annular chain guide and configured to allow said bicycle chain to pass through an opening therein.

* * * * *